United States Patent [19]

Leva

[11] 3,928,513
[45] Dec. 23, 1975

[54] GAS-LIQUID CONTACT APPARATUS

[76] Inventor: Max Leva, One Hodgson Ave., Pittsburgh, Pa. 15205

[22] Filed: June 5, 1973

[21] Appl. No.: 367,133

Related U.S. Application Data

[63] Continuation-in-part of Ser. No. 180,381, Sept. 14, 1971, abandoned.

[52] U.S. Cl............................ 261/113; 261/114 TC
[51] Int. Cl.² ............................................. B01F 3/04
[58] Field of Search...... 261/113, 37, 114 R, 114 A, 261/114 JP, 114 YT, 114 TC

[56] References Cited
UNITED STATES PATENTS

| | | | |
|---|---|---|---|
| 2,491,726 | 12/1949 | Glitsch | 261/114 TC X |
| 2,582,826 | 1/1952 | Glitsch | 261/114 R X |
| 2,711,307 | 6/1955 | Milmore | 261/108 |
| 2,860,860 | 11/1958 | Wilson | 261/113 |
| 2,939,771 | 6/1960 | McDonald et al. | 261/113 X |
| 3,044,237 | 7/1962 | Mart | 55/257 |
| 3,079,134 | 2/1963 | Winn | 261/113 |
| 3,233,708 | 2/1966 | Glitsch | 261/113 X |
| 3,367,638 | 2/1968 | Leva | 261/113 |

Primary Examiner—Frank W. Lutter
Assistant Examiner—William Cuchlinski, Jr.
Attorney, Agent, or Firm—Donn J. Smith

[57] ABSTRACT

This invention relates to a multiple-plate, gas-liquid contact tower, wherein the plates are arranged in closely spaced relationship and carry relatively thin liquid films. Each plate has a plurality of apertures defined by depending chimneys. Each of the plates comprises a plurality of segments with their edge portions overlapping but not welded together or otherwise rigidly secured. A plurality of rods extend vertically through registering holes in said plates for clamping them together, but the segmented construction of the plates permits threading through only a few of the rods at a time when installing a particular segment. The edges of the segments can be provided with vertically extending reenforcing flanges which are perforated to allow free liquid flow on the plates.

21 Claims, 11 Drawing Figures

INVENTOR
MAX LEVA
BY
William J. Ruano
his ATTORNEY

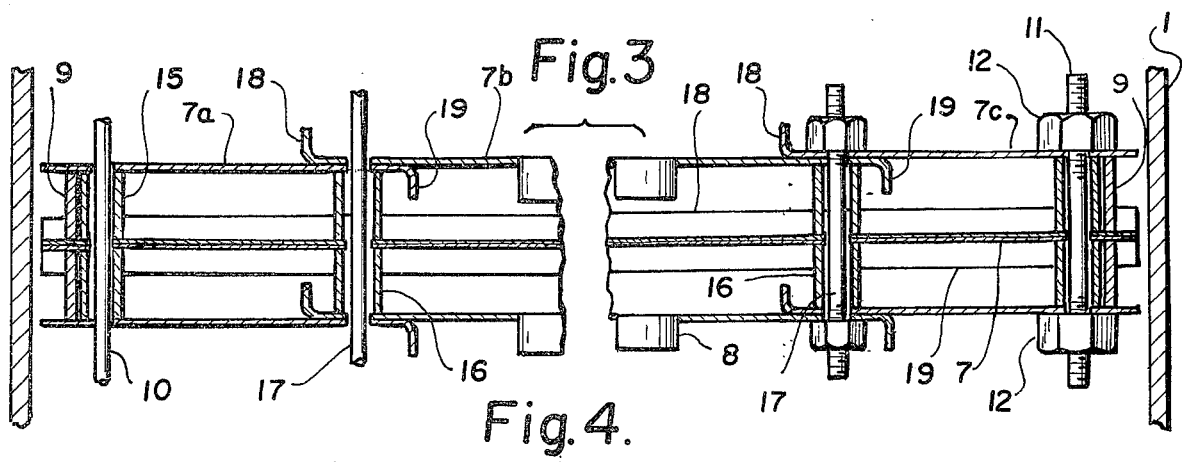
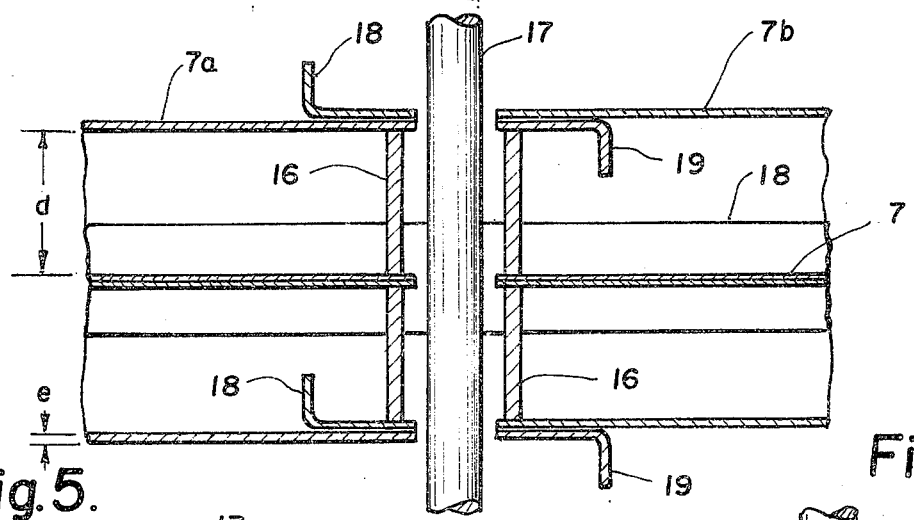
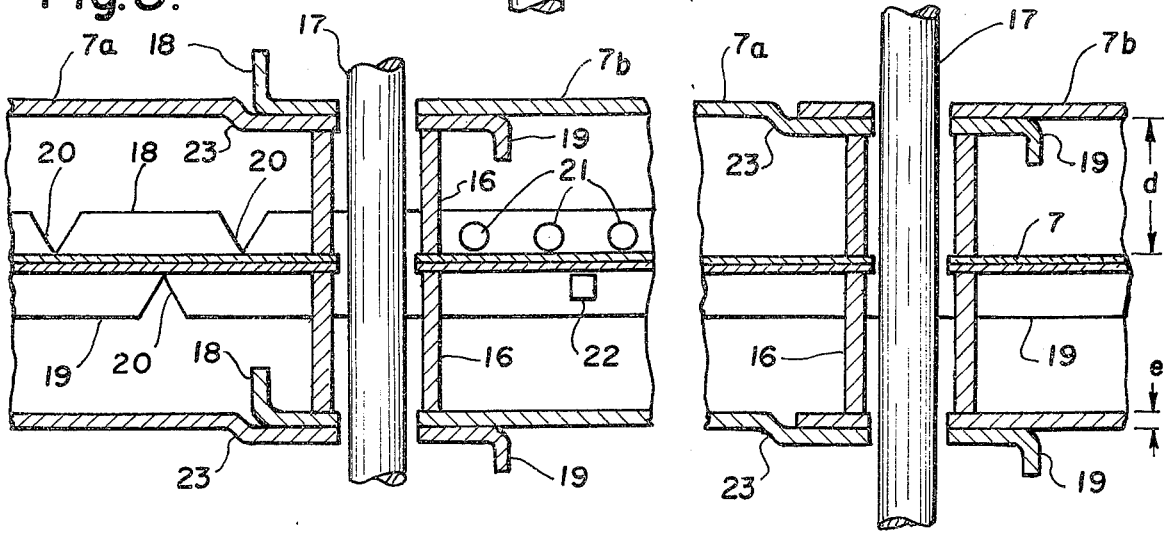

GAS-LIQUID CONTACT APPARATUS

The present application is a continuation-in-part of my copending application entitled Gas Liquid Contact Apparatus, Ser. No. 180,381 filed Sept. 14, 1971, now abandoned.

This invention relates to multiple-plate gas-liquid contact towers of the type wherein the plates are arranged in closely spaced relationship and designed to carry a relatively thin liquid film. A tower of this type is described, for example, in my U.S. Pat. Nos. 3,075,752 and 3,367,638, wherein typical interplate spacings of the order of 1 to 4 inches are employed. Since the contact plates in towers of this design carry only a relatively thin film of liquid, seldom greater than one-quarter to one-half inch in depth in contrast to many other plate towers wherein the liquid layer on the plates may be of the order of 3 inches or more in depth, the contact plates may be made of relatively thin-gauge materials, and there is no necessity for heavy duty structural supports for the individual plates.

While offering the advantage of relatively low liquid loading per plate and the corresponding possibility of a lightweight, inexpensive construction, contact towers of this type offer rather special construction problems because of the large number and relatively close spacing of the plates. One problem is that of avoiding gas and liquid bypassing between the tower shell and the periphery of the plates, resulting in decreased tower efficiencies. Ideally, this bypassing could be avoided by maintaining very close tolerances between the periphery of the plates and inner surfaces of the tower shell. This is impossible to achieve, however, in practice without inordinate costs and, accordingly, some means must be provided for sealing the periphery of the plates to prevent gas and liquid bypassing.

Another problem is the avoidance of any warping or other distortion of the relatively thin-gauge plates. This may occur if the plates are welded or otherwise rigidly secured together in segments or not sufficiently supported and anchored within the tower. Any substantial deviation of the plate surfaces from the horizontal as a result of warping or other distortion results in uneven distribution of the thin liquid film on the surface of the plate, decreasing tower efficiency. In this connection, it has been found that spot or seam welding of the plates to supporting members is generally not satisfactory in that it tends to cause warpage or other distortion of the plate surfaces. Particularly, in plates of large diameter, great difficulty is encountered in handling and in assembly, such as in the threading of the long vertical rods, which tend to bend, through registering holes in the stacked plates. Considerable assembly time is required for such threading of rods, adding considerably to the cost of the assembly. In very thin plates of large diameter, the tendency of distortion and warping is even greater and the assembly is very tedious.

Still a third problem, aggravated by the relatively large number and close spacing of the plates, is the necessity for providing a construction which may be readily assembled and disassembled without distortion or damage to the plates or supporting members to permit rapid and economical cleaning or other servicing.

In accordance with the present invention, a new and improved mode of plate assembly has been discovered which considerably reduces the time required for assembly and which makes possible the use of thin-gauge plates and light weight supporting structure while, at the same time, providing a satisfactory solution to all of the foregoing problems. Gas and liquid by-passing between the edge of the plates and the tower shell is eliminated. Adequate support and spacing for the plates are provided, particularly in their peripheral portions, but also throughout the plate areas eliminating the tendency for warping and other types of distortion. At the same time, a plate assembly is provided which can be easily and quickly installed as a number of plate subassemblies, but removed from the tower shell as a unit, and which may be quickly and easily taken apart, plate by plate, if desired, and reassembled with no damage to the individual plates or supporting elements.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same wherein:

FIG. 3 is an enlarged, vertical, cross-sectional view taken along line III—III of FIG. 2;

FIG. 4 is a further enlarged, vertical, cross-sectional view of one of the rod assemblies shown in FIG. 3;

FIG. 5 is a modification of the construction shown in FIG. 4;

FIG. 6 is a further modification of the structure shown in FIG. 4;

Figure 1:
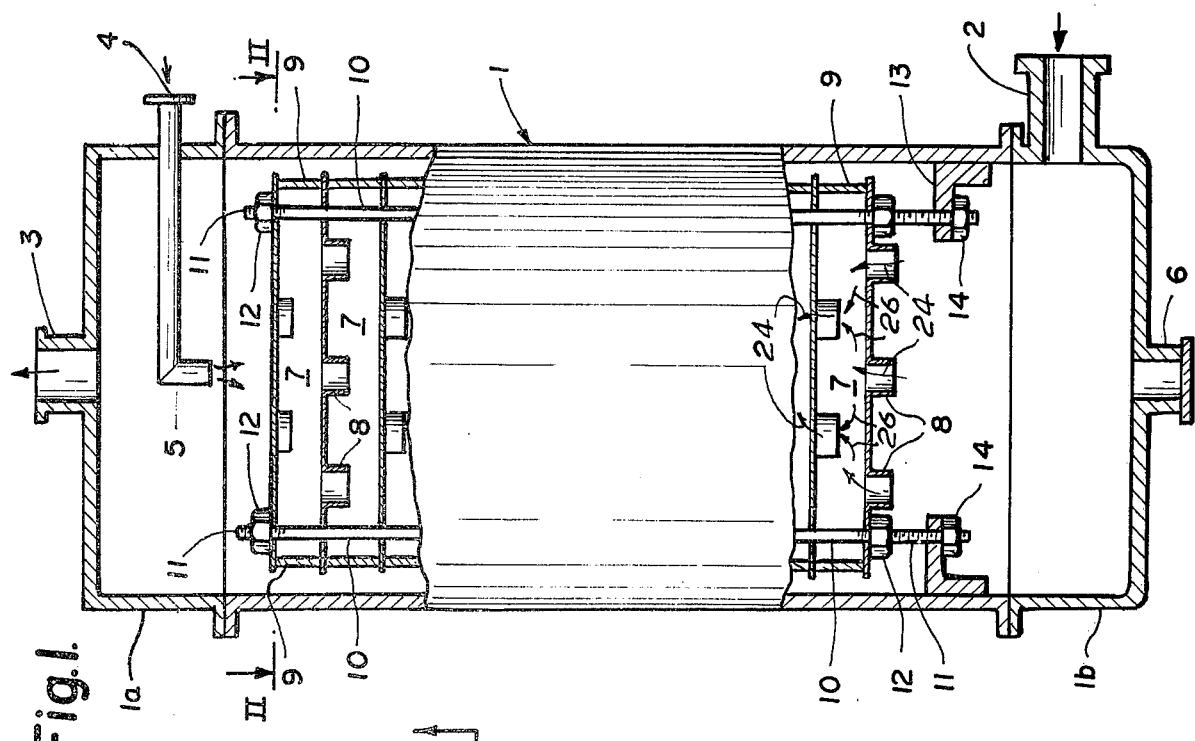
FIG. 1 is a side elevation, partly in section, of one embodiment of a gas-liquid contact tower constructed in accordance with the invention; with parts removed for clarity.

Referring more particularly to FIG. 1 of the drawing, numeral 1 generally denotes a cylindrical tower shell provided with a flanged cover 1a and a flanged bottom portion 1b. Gas is admitted into the body of the tower through inlet 2 and leaves at the top through outlet 3. Liquid is admitted at the top of the tower through pipe 4 which has at 5 a distributing nozzle or other suitable distributing device (not shown), and is withdrawn from a sump at the bottom of the tower through outlet 6.

Figure 2:
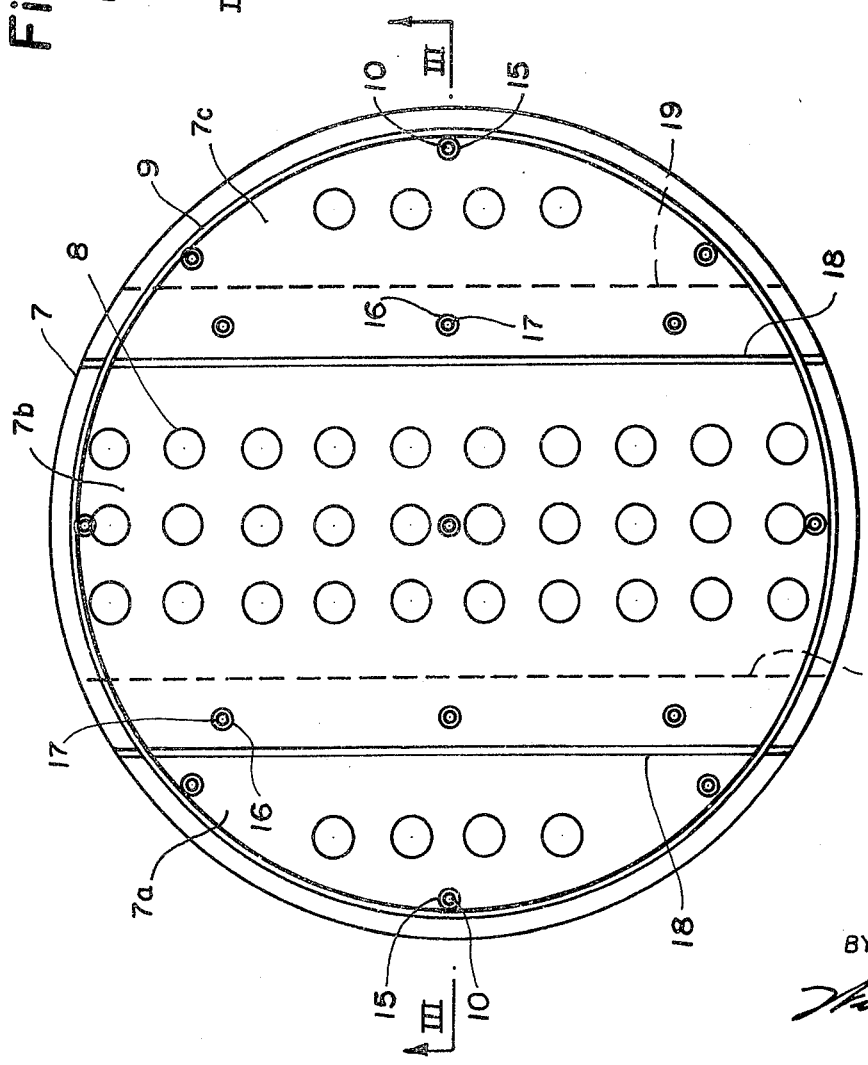
FIG. 2 is an enlarged, horizontal, cross-sectional view taken along line II—II of FIG. 1.

The interior of the tower is provided with a series of super-imposed horizontal plate assemblies 7, each comprising a composite disc having integral, downwardly extending chimneys 8 in registry with holes or apertures formed in the composite disc as best seen in FIG. 2. By rotating alternate plates 90° with respect to adjacent plates, the plate apertures are arranged in staggered relationship from one plate to the next. This is best seen in FIG. 1.

As explained in detail in my U.S. Pat. No. 3,075,752, the chimneys 8 and the unobstructed top surfaces of the plates greatly improve the efficiency of the tower by providing coordinated gas and liquid flow and bringing the gas and liquid into intimate contact at the surface of the plates that lie below the chimneys 8.

In operation of the tower, liquid introduced through pipe 4 and nozzle 5 spreads over the surface of the top horizontal plate, flows through the apertures and down the chimneys 8 to the surface of the next plate whence it flows over the surface of that plate through the next series of apertures, and so forth down through the tower. Gas introduced through inlet 2 flows upwardly through the apertures of the lowermost plate, across the surface of the plate to the apertures in the next plate, and so forth, upwardly through the tower. The gas flow pattern is indicated by arrows 24, 26 in FIG. 1. More particularly, the chimneys 8 cause the gas to flow horizontally (arrows 26) which engenders the aforementioned intimate contact between the liquid and gaseous phases.

Since in plate assemblies of the design shown, the plates carry only a thin film of liquid, generally not over about one-half inch in depth and usually less, the plates may be constructed of relatively thin gauge metal or other structural materials having a thickness $e$ in the order of 12 to 26 gauge (0.104 to 0.018 inch), with a preferred range of 16 to 24 gauge (0.065 to 0.022 inch). The inter-plate spacing $d$ is quite close and will generally range from about one-half inch to not more than 6 inches and usually from about 1 to 3 inch vertical distance between plates.

In an arrangement of this type, a series of shallow chambers are created between adjacent pairs of plates, and it is critically important to prevent the gas from flowing out of the chambers at the outer edges of the plates and bypassing along the inner wall of the tower shell 1. It is equally important to prevent the liquid from flowing off the edge of the plates and bypassing along the tower shell.

Means for sealing the chambers at their periphery are provided in the form of ring shaped members 9, preferably constructed of relatively thin gauge metal, e.g. 10 to 22 gauge, and having a height equal to the design vertical interplate spacing distance. The ring shaped members 9 are spaced slightly in from the peripheral edges of the plates and completely enclose substantially the entire area of the plates, sealing off the periphery of each chamber from outward or radial gas and liquid flow, thus confining gas and liquid flow entirely to the apertures in the plates.

Passing through holes provided in the plates, a series of vertical rods 10 are preferably arranged so that they lie directly against or quite close to the ring shaped elements 9.

Rods 10 pass through the entire plate assembly, as best seen in FIG. 1, and are provided at their top and bottom portions with means, such as nuts 12, adapted to engage threaded end portions 11 of rods 10, which will clamp the entire assembly of plates and ring shaped members 9 into a tight unit which can be quickly and easily assembled and disassembled without damage to any of the parts. When the nuts 12 at the ends of the rods are drawn up tight, clamping pressure is exerted between the surfaces of the plates and the upward and lower edges of the ring shaped members 9. This forms a seal between the surfaces of the plates and the ring shaped members 9, and the seal prevents gas and liquid bypass, while at the same time the ring members 9 give rigid support to the relatively thin gauge plates and prevent or minimize any tendency to warp, buckle, or undergo other forms of distortion. Any suitable means may be employed for supporting the plate assembly in the tower shell, such as an L-shaped bracket 13 extending entirely around the inner surface at the bottom of the tower shell and supporting the plate assembly on the bottom portion of the rod 10 screw threaded to selective heights by bolts 12, 14.

If desired, particularly in towers of large diameter, additional vertical rods, such as 17, located somewhat centrally of the plates, may be employed to provide additional support for the plates as shown in FIGS. 2 and 3.

Groups of stacks of the construction shown in FIG. 1 are employed with vertical spaces therebetween, and wherein at least some of the peripheral rods 10 extend through all the groups. And while only three plates are shown, per stack in FIGS. 3 to 6, obviously any large number of stacked plates, per stack, may be used instead. The most common numbers of plates per stack range between about 5 to 50 plates, with 10 to 30 plates preferred.

While ideally the disc shaped plates should be made in one piece, nevertheless, for larger than 3½ to 4 foot diameter plates, it has been deemed necessary, prior to my present invention, to make a composite plate having parts, spot welded together, because sheet steel from mills comes usually in 48 inch sheets. However, such spot welded plate assemblies have outstanding disadvantages, namely, the plates warp and, particularly in large diameter plates great difficulty and considerable time is required for assembly to extend the vertical rods through the registering holes in the vertically stacked plates, since the very long rods tend to bend as the result of such threading of the rods.

In accordance with the present invention, the above difficulties are entirely eliminated by the remarkable and unexpected discovery that such plates, particularly those of large diameter, may be made in segments which are simply overlapped and super-imposed, one with respect to an adjoining segment, without the necessity of welding or otherwise directly securing the overlapping edges one to another. More specifically, as will appear more clearly from FIGS. 2 and 3 of the drawing, each disc shaped composite plate is made up of a plurality of segments, such as three segments (although the number could be more or less than 3), comprising segments 7a 7b, and 7c, which are assembled in place by threading through only a relatively small number of rods 17 through cylindrical spacers 16. Segment 7a has a downwardly extending flange 19 (see FIG. 3) which considerably reenforces the segment, therefore is greatly useful to prevent warping of very thin gauge sheets. Also it provides a handle for easy grasping and assembly of the plate. Then segment 7b is laid in overlapping relationship onto segment 7a while threading only the rods extending therethrough, which segment 7b is provided, at one end, with an upwardly extending flange 18 and, at the other end, with a downwardly extending flange 19. Finally the third segment 7c is laid in overlapping relationship on segment 7b, provided with a single upstanding flange 18, while threading only the rods extending through the holes of segment 7c.

This same construction occurs in each of the stacked plate assemblies 7. It will be remembered that adjoining plates are turned 90° horizontally relative to each other, therefore, the next lower plate in FIG. 3 shows only the face of the upstanding flange 18 and that of the downwardly extending flange 19. Thus, the same overlapping pattern of plate segments is repeated in all stacked plates throughout the entire height of the assembly, as illustrated in FIG. 1. Along the periphery of the stacked plates are spaced clamping bolts 11 and nuts 12 threaded to rods 10 and inserted through tubular spacers 15.

A preferred inter-plate spacing $d$ (see FIG. 4) is between about three-quarter inch and about 3 inches and particularly good results have been attained with spacings of 1 to 2 inches. Flanges 18 and 19 are preferably of the order of one-half inch in height, and in the range of one-eighth to five-eighth inch. The construction shown in FIGS. 3 and 4 is suitable for relatively thin gauge plates of the order of 20 to 26 gauge, since even though the segments are overlapped and the spacing cylinders 16 are of the same length, no serious spacing problems are involved as to the different plate spacings of the various segments, since it will readily appear in FIG. 4 that segments 7b are located higher than that of segments 7a, and segments 7c are located higher than segments 7b, each by the thickness $e$ of the sheet material of the plate, therefore the liquid film will not be of uniform thickness on top of segments 7a, 7b and 7c. However, for very thin plates, this difference is negligible.

FIG. 5 shows a modification of FIG. 4 shich is particularly useful for plates of larger thickness, e.g. up to 20 gauge, wherein each segment is offset vertically downwardly by the plate thickness $e$, for example, at 23, so that the next segment 7b when overlapped thereon will be in the same horizontal plane, also the next adjoining segment 7c, so as to ensure identical vertical positioning of the stacked plate segments throughout the entire diameter of the plates and a film or uniform thickness.

In order to permit liquid film on each plate to flow freely through the flanges 18 and 19, such flanges are provided with notches, such as 20 or apertures, such as 21 or 22 as illustrated in FIG. 5, or other shaped openings, through the flanges.

FIG. 6 shows a further modification which is smilar to FIG. 5 for the same or larger guage sheets, but wherein the upstanding flanges 18 are not needed and, therefore, are omitted. Although the downwardly extending flanges 19 are retained, even they can be omitted in relatively large gauge sheets.

It will be noted in the preceding figures and in certain of the figures described below, that alternate ones of the vertically spaced plates are identically arranged and that the remainder of the plates are turned in their respective horizontal planes thru 90° therefore bringing into view only the faces of the several flanged portions of the plate segments. While the various flanged portions are shown as extending throughout the entire width of the plate segments, they may extend, instead, along only a portion of the width, depending on the amount of reenforcement required.

Figure 7:
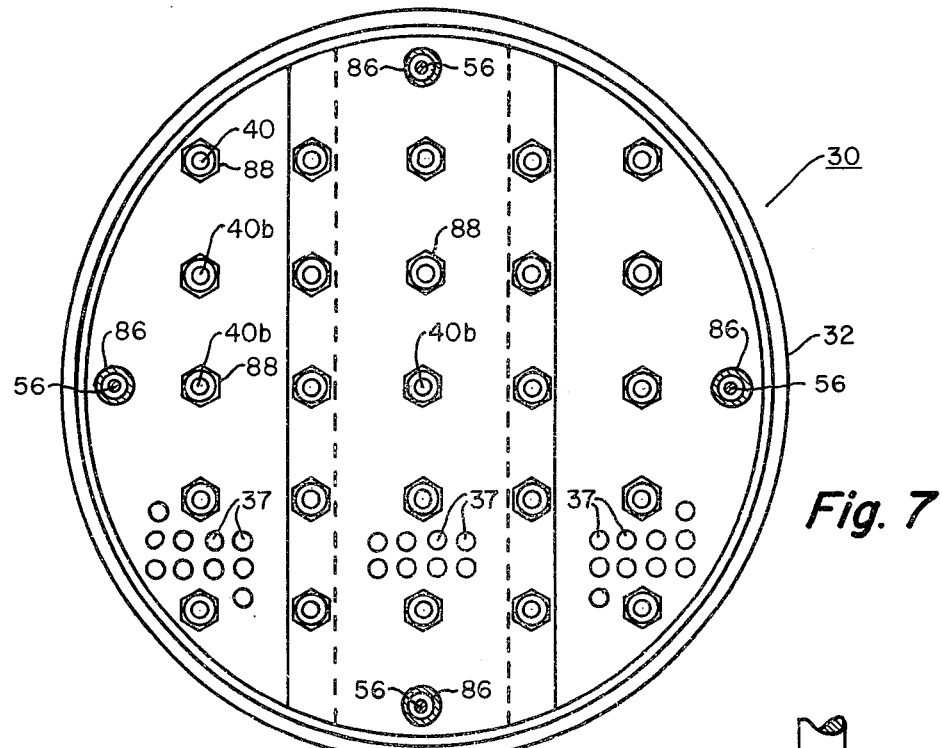
FIG. 7 is a cross-sectional view of another embodiment of a gas-liquid contact tower constructed in accordance with the invention.
Figure 8:
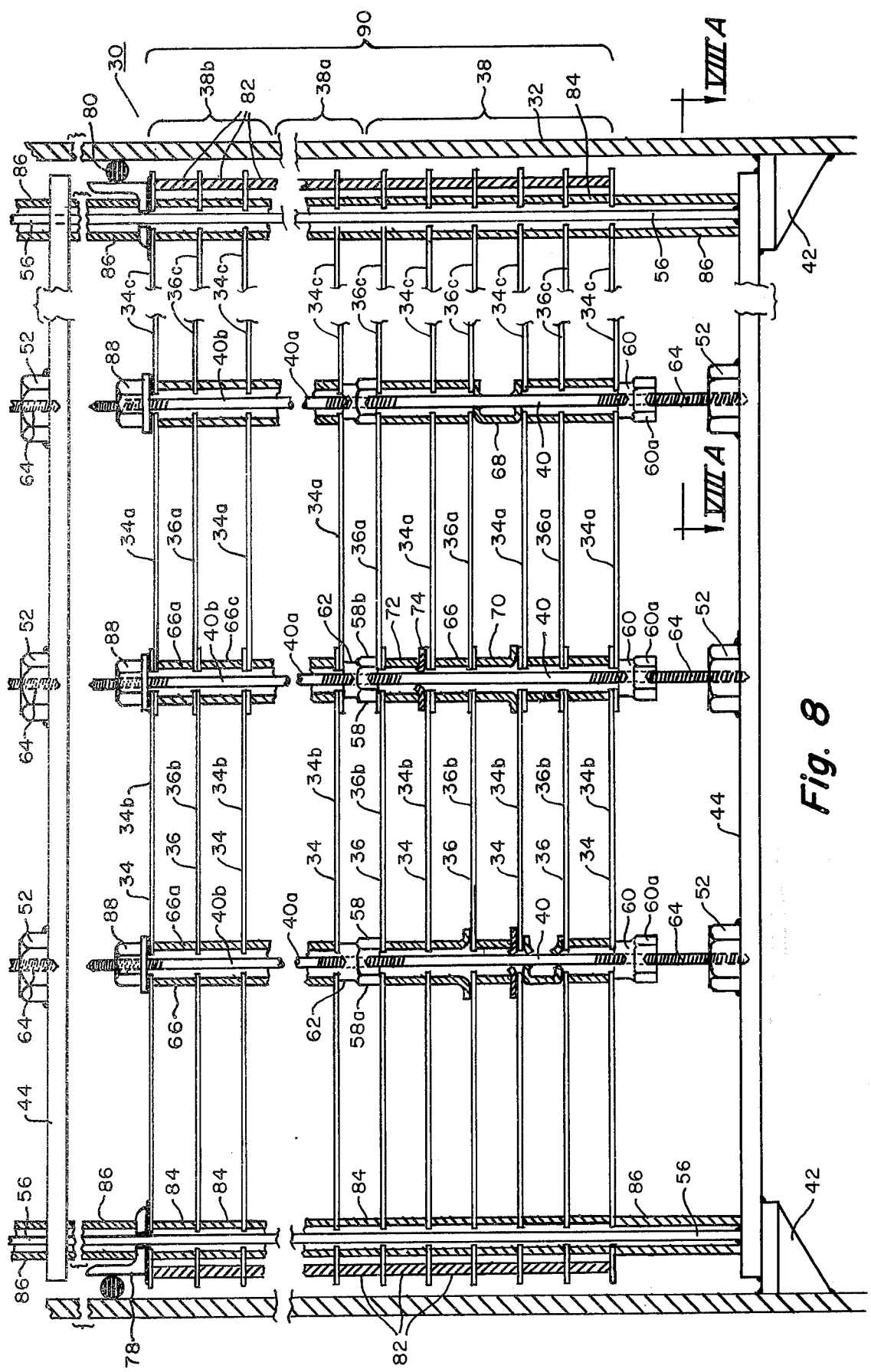
FIG. 8 is an enlarged, partial, vertically sectioned view of the tower of FIG. 7.

Another exemplary form of my novel gas-liquid contact tower 30 is illustrated in FIGS. 7 and 8. The tower 30 includes a shell 32 and alternating arrays of plates 34, 36. Each of the plates 34 or 36 is of a composite, discoidal configuration and is formed of three segments, as better shown in FIG. 7, although a different number of segments can be employed depending upon the diametric size of the shell 32.

Each of the plate segments 34a, 34b, 34c and 36a, 36b, 36c are provided with flow apertures 37, as better shown in FIG. 7. The plate apertures 37 can be further provided respectively with downwardly extending tubular extensions or chimneys (not shown in FIGS. 7 and 8) similar to the chimneys 8 illustrated in FIGS. 1–3. As noted previously the presence of the chimneys aid in emphasing the horizontal flow components of the up-flowing gas which aid in the distribution of the irrigating liquid over the plate surfaces and in promoting interphasal contact.

The plates 34 and 36 are essentially identical, save that intermediate segments 34a of the plates 34 underlie the edge portions of adjacent plate segments 34b, 34c respectively. On the other hand intermediate segments 36a of the plates 36 overlie the edge portions of the adjacent plate segments 36b, 36c respectively. In contrast to the FIG. 2 arrangement described previously, the central or intermediate plate segments 34a or 36a either overlie or underlie both of the overlapping edge portions of the adjacent segments 34b, 34c or 36b, 36c respectively. Thus, the plate segments 34b, 34c of each plate 34 are disposed at the same elevation, as are the plate segments 36b, 36c of each plate 36, rather than being separated by a vertical distance equal to two thicknesses of the plate material. In those applications where more than three plate segments are employed the alternating over and under relationship among the several plate segments, evident from FIG. 7, is desirably maintained across the width of the plates.

In the contact tower 30 of FIGS. 7 and 8, each of the composite plates 34 or 36 can be disposed exactly on a horizontal plane, i.e. perpendicular to the vertical axis of the shell 32, in contrast to the slightly tilted disposition usually preferred for the composite plate arrangements of FIGS. 1–4. It is also noteworthy that in the modification of the invention as shown in FIGS. 7 and 8, the edge flanges of the preceding figures are omitted. However, owing to the thinness of the several plate segments, each composite plate 34 or 36 essentially will be uniformly wetted by the down-flowing liquid. The horizontal flow components of the up-flowing gas streams also aid in distributing the liquid horizontally and uniformly over the several plates 34, 36 of the tower 30, but more particular the operating surfaces thereof as defined by the peripheral spacing rings 82 and the tie-rod and guide rod spacing means described below.

It will be noted from FIG. 8 that the alternating plate segments 34b, 36b and 34c, 36c are uniformly spaced in the vertical direction of the tower 30. On the other hand owing to the alternating over and under relationship of the intermediate segments 34a, 36a, it is evident that alternate pairs of the intermediate segments 34a–36a are more closely spaced than the remaining pairs 36a–34a of the intermediate segments. Although not essential for the operation of the tower 30 these alternating narrower and wider spacings are desirably for a number of reasons, (a) the contact characteristics of the slightly raised segments 36a of the plates 36 are counterbalanced by the contact characteristics of the slightly lowered segments 34a of the plates 34, (b) alternate plates are not turned 90° in contrast to preceding figures, and (c) the over and under relationship of the segments 36a, 34a respectively prevent the formation of flow patterns and loss of efficiency of the tower 30. However, the over and under relationship of the intermediate segments 34a, 36a does necessitate usage of differing lengths of inter-plate spacing means as described more fully below.

FIGS. 7 and 8 illustrate another unexpected feature of the invention, whereby a relatively small number of the plates 34, 36 can be assembled into a relatively narrow bundle (in the vertical direction) in order to facilitate insertion of the several tie-rods and guide rods through the individual plate segments. In accordance with an ancillary feature of the invention, a relatively large number of these plate bundles can be quickly and vertically assembled without undesirable modification of plate-to-plate distances where the several bundles are joined. As evident from FIG. 8 a single plate bundle or subassembly 38 can consist of six plates 34, 36, although obviously a different number can be employed depending upon the application of the invention, size of the individual plates 34 or 36 and relative difficulties of assembly. The use of discrete plate bundles 38 permits the use of relatively short tie-rods 40 which accordingly are much easier to manipulate in assembling the individual plate bundles 38. Of course, the actual lengths of the tie-rods 40 for a given plate bundle will depend vertical distances between the plates 34, 36, and these distances can be varied within the ranges pointed out previously. In order to take advantage of the last-described feature of the invention, it is not of course essential that the plates be segmented, unless the diameter of the shell 32 is larger than about 4 feet (for reasons advaned previously).

Figures 8A, 9, 10:
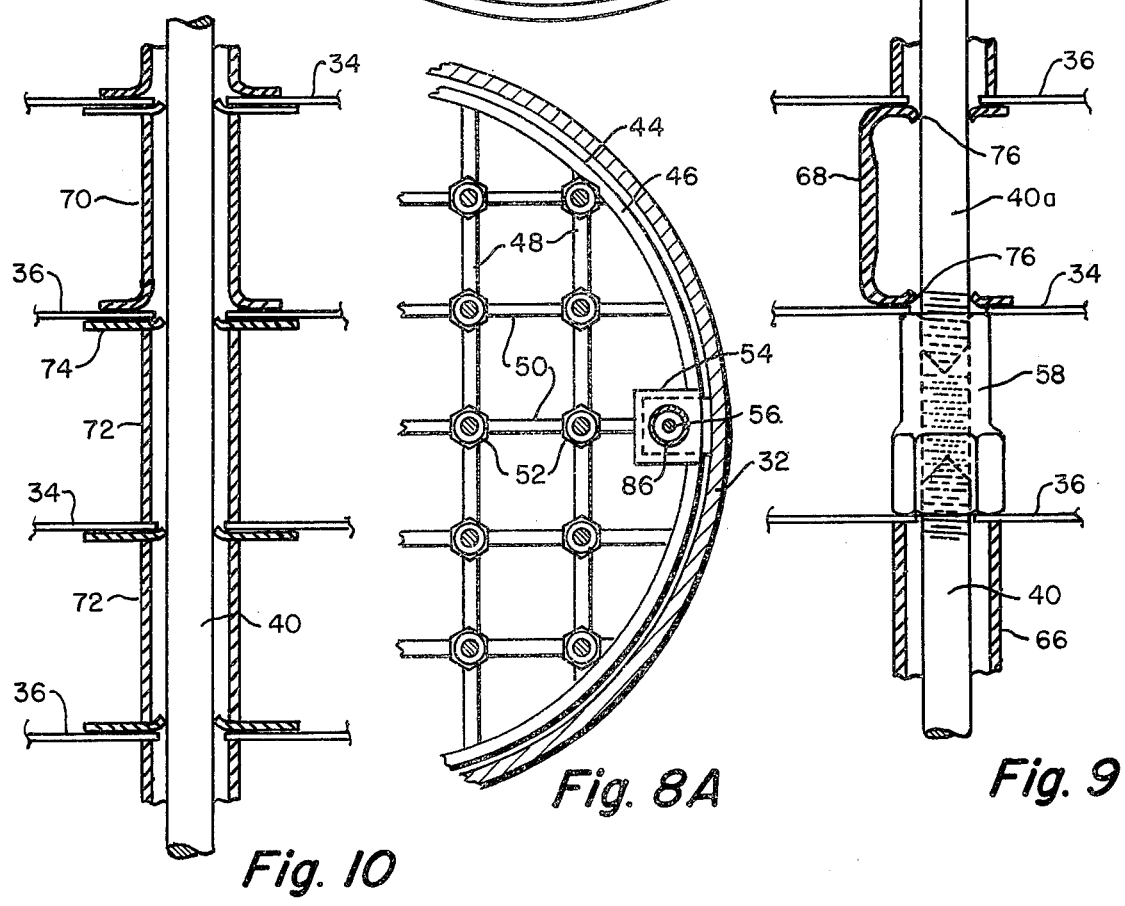
FIG. 8A is a partial cross-sectional view of the tower as shown in FIG. 8 and taken along reference line VIIIA—VIIIA thereof.
FIG. 9 is an enlarged, partial, longitudinally sectioned view of an alternative arrangement of plate bundle spacing means shown in FIG. 8.
FIG. 10 is a similar view of an alternative arrangement of the spacing and tie-rod sealing means shown in FIG. 8.

The structure of the contact tower 30 of FIGS. 7 and 8 will now be described in greater detail. The shell 32, only a portion of which is shown in FIG. 8, can have an overall construction similar to the shell 1 shown in FIG. 1. Adjacent the lower end of the shell 32 a series of circumferentially arranged brackets 42 are secured to the inner wall surface of the shell 32 in order to anchor a supporting grid 44. The grid 44 desirably is as foraminous as possible to minimize interference with the flow of the gas and liquid phases within the contact tower 30 and to facilitate adjustment of the tie-rod components described below. As better shown in FIG. 8A, the grid 44 can be constructed from a circumferential band 46 and crossed support bars 48, 50. At the points of intersection of the support bars 48, 50 anchor nuts 52 are secured as by welding. The supporting grid 44 includes a number of anchor plates, such as the plate 54, in order to secure, as by welding, the lower ends of guide rods 56 which desirably extend uninterruptedly through the several bundles 38 of the plates 34, 36. As evident from FIG. 7 four such guide rods are employed in the illustrated example, although a different number of guide rods can be utilized.

As noted above each plate bundle or subassembly 38 is tied together by a number of tie rod sections 40 each having a length determined by the vertical thickness or height of the subassembly 38. As evident from FIG. 7 the tie-rods are arranged into a number of rows extending across the plates 34, 36, and are inserted thru aligned holes therefor in the various and respective plate segments. Desirably the tie-rod holes are larger than respectively adjacent portions of the tie-rods so that the plate segments can expand and contract laterally of the tie-rods and in their own planes with respect to one another. Each tie-rod additionally is inserted through a number of spacers described below and inserted between adjacent plates to maintain the desired interplate spacing throughout the plate subassemblies 38. Of course, the number of plate subassemblies 38 used in a given application of the invention, will depend upon the number of plates 34, 36, the interplate spacing and the overall height of the tower shell 32. The use of the relatively large number of the tie-rods 40 (FIG. 7) also reduces the tendency of the plate segments to warp or otherwise deform during thermal cycling. At least two rows (depending upon the number of plate segments actually used) of the tie-rods 40 are extended along the overlapping edges respectively of the plate segments to aid in joining these segments without the use of welding or undesirable fastening means for securing the overlapping plate segment edges directly and rigidly to one another. However, the clamping pressure of the spacers through which the tie-rods 40 are inserted is not sufficient to prevent relative movement of the overlapping edge portions of the plate segments as occassioned by thermal cycling.

With reference now more particularly to FIG. 8 each of the tie-rods 40 desirably is threaded at each end for engagement with hex nuts 58 and 60 respectively. The upper hex nuts 58 serve also as spacers for the adjacent plate segments and therefore desirably are provided in at least two sizes 58a and 58b in order to accommodate the variable spacings among the several plate segments. A third size of the upper hex nut 58 can also be provided to accommodate the alternate, wider spacing between the intermediate segments 34a, 36a if this should appear at the top of the subassembly 38 instead of the narrower interplate spacing as shown. The differences in height of the upper hex nuts 58 can be effected by shortening or lengthening the interiorly tapped extensions 62 of the hex nuts. The hex nut extensions 62 also serve in this example as threaded connections for the tie-rod segments or sections 40a of a superimposed plate subassembly 38a.

The lowermost one of the plate subassemblies 38 desirably is spaced upwardly from the supporting grid 44 by a number of short, connecting tie-rod sections 64 which are threaded for engagement with the lower tie rod nuts 60 and also with the grid anchor nuts 52 described previously. In addition to spacing the plate subassemblies from the supporting grid in order to minimize flow distortions caused thereby, the use of the short connecting rods 64 also permit ready elevational adjustment of the lower tie-rod nuts 60, some of which must be disposed at a slightly different elevation (for example the tie-rod nuts 60a) in order to accommodate the slightly displaced intermediate plate sections 34a. It is contemplated of course that the separate tie-rod anchors 52 can be eliminated and the lower tie-rod nuts 60 secured directly to the supporting grid 44 in place of the aforementioned anchor nuts 52. In the latter case elevational adjustments can be accomplished with washers or other shims (not shown).

FIG. 8 represents a variety of forms of spacing members associated with the tie-rods 40, 40a and 40b in order to maintain the desired spacing between vertically adjacent plate segments. In the upper plate subassemblies 38a, 38b the various plate separations are effected by a number of ferrules or tubular spacers 66 which are provided in three sizes 66a, 66b and 66c in the illustrated example in order to maintain the uniform spacing between the plate segments 34b–36b and 34c–36c and the variable spacing between the intermediate plate segments 34a–36a. The differences in the respective lengths of the tubular spacers 66a, 66b and 66c (and in the equivalent sizes of the related spacing means 68, 70, 72–74) are determined by the thicknesses of the plate segments.

Although desirably the overall plate assembly within a given shell 32 is provided uniformly with the same type of spacing means for purposes of illustration the plate subassembly 38 is shown with a variety of spacer constructions. Thus, in addition to the aforementioned tubular spacers 66, a C-shaped spacer 68, a flanged spacer 70, and a combination tubular spacer 72 and washer 74 are envisioned, along with the usual mechanical equivalents. The flanged washer 70 (FIG. 10) provides a greater sealing area with the adjacent plate segment and thus lessens the possibility of the liquid phase entering the holes provided for the tie-rods. Entry of such liquid is perhaps more effectively blocked by the use of washer 74 and/or the C-shaped spacers 68 (FIGS. 9 and 10), both of which are provided with punched closely fitting openings through which the tie-rods 40 are inserted. The punched apertures in the C-shaped spacer 68 and the washers 74 are defined by circumferential burrs or knife-edges 76 (FIG. 9) which closely and sealingly engage the adjacent surfaces of the tie-rods 40 when the latter are pushed therethrough. Such sealing engagement prevents any portion of the irrigating liquid from decending along the tie-rods 40 and bypassing the chimneyed apertures 37. By thus preventing any by-passing of the irrigating liquid along the tie-rods 40, the contacting efficiency of the tower 30 is greatly improved. As in the case of the tubular spacers 66, the C-shaped spacers 68, the flanged tubular spacers 70, and the tubular spacer and washer combination 72–74, when employed, can be provided in three sizes for the embodiment of the invention as shown in FIGS. 7 and 8. In addition to their sealing capabilities, usage of the washers 74 (FIGS. 8 and 10) lends mechanical stability to the plate subassemblies.

At the top of the plate assembly a top sealing ring 78 constructed as a circular angle iron or the like is mounted on the topmost plate and extends about the periphery thereof. To allow for expansion and contraction during thermal cycling of the tower 30, the top sealing ring 78 is spaced inwardly of the shell 32, as are the peripheral edges of the plate segments. By-passing of the plate assembly by liquid or gas flow along the inner wall surfaces of the shell 32 is prevented by a circular gasket or O-ring 80. Similarly, bypassing of the liquid and gas phases around the peripheral edges of the plate segments is prevented by a series of spacing and sealing rings 82 alternating with the plates 34, 36.

Although not essential, tubular spacers 84 can be associated with each of the guide rods 56 in a manner similar to the tie-rod spacers 66. Alternatively, spacers similar to the C-shaped spacers 68, the flanged tubular spacers 70, or washer and tubular spacer combinations 72–74 can be substituted for the guide rod spacers 84. Elongated guide rod spacers 86 desirably are employed between the lowermost composite plate and the supporting grid 44, as shown in FIG. 8.

It will be understood that an additional plate assembly similar to that shown in FIG. 8 and consiting of a number of plate subassemblies can be mounted above the top sealing ring 78 and gasket 80 as denoted by the broken off upper ends of the guide rods 56 and the shell 32.

The operation of the contact tower 30 is essentially as described in connection with the preceding figures. To assemble the plate assembly as shown in FIG. 8 the supporting grid 44 is provided with the tie-rod anchors 52 and is welded or otherwise secured to the shell brackets 42. The lower ends of the guide rods 56 are welded to the supporting grid tabs or plates 54 (FIG. 8A) and the longer guide rod spacers 86 are slipped thereover. The threaded connecting rod sections 64 are then engaged with the anchor nuts 52. The lower tie-rod nuts 60 in turn are engaged with the upper ends of the connecting rods 64 and these rods 64 and lower tie-rod nuts 60 are adjusted so that the upper ends of these nuts together with the upper ends of the elongated guide rod spacers 86 precisely define a horizontal plane, with the exception that the tie-rod nuts 60a are disposed in a slightly lower horizontal plane (in the illustrated example) to accommodate the adjacent intermediate plate segment 34a. The tie-rod sections 40 are then engaged with the lower tie-rod nuts 60, 60a, the plate segments of the lowermost plate are lowered over the guide rods 56 and over the tie-rod sections 40, and the tubular spacers 66 or equivalent for the next composite plate are passed over the tie-rods 40 with attention to the use of the longer or shorter spacers 66b or 66c or equivalent to accommodate the varied spacings of the intermediate plate segments. The tubular spacers 84 or equivalent are likewise slipped over the guide rods 56. The segments of the vertically adjacent plate are then assembled over the guide rods 56 and the tie rods 40 so as to rest upon the aforementioned spacing means such as the spacers 66, 84. The assembly is continued in this fashion until the threaded ends of the tie-rods 40 just protrude through the uppermost composite plate of the plate subassembly 38. The upper tie-rod nuts 38 are then applied in the requisite sizes as determined by the location of the tie-rods with respect to the individual plate segments.

At this point in the assembly procedure, a second plate subassembly is commenced with the respective plate segments resting on the tie-rod connecting means such as the upper tie-rod nuts 58a and 58b. The assembly procedure continues as set forth above. The use of relatively short tie rod segments 40 greatly facilitates the insertion thereof through the relatively large numbers of tie rod holes in the composite plate as the segments thereof are individually applied to construct the several plate subassemblies. The tie-rod sections 40b of the uppermost plate subassembly 38b can be secured by ordinary hex nuts 88.

The plate assembly 90 (FIG. 8), including several of the subassemblies 38, can be removed and reinserted relative to the shell 32 as a unit by unthreading the short connecting rod sections 64 or by releasing the supporting grid or foraminous support 44 from the shell brackets 42.

One or more additional plate assemblies (depending upon the height of the shell 32, can be assembled above the plate assembly 90 by disposing additional ferrules 86 over the guide rods 56 and mounting a successive flow grid or foraminous plate 44 thereon, with the tabs 54 or the like of the plate 44 resting on the upper ends of the ferrules 86. Additional ferrules 86 can then be slipped over the guide rods 56 to rest on the successive grid plate 44 as in the case of the lower plate 44. The connecting tie rod sections 64 are then engaged with the anchor nuts 52 of the successive flow plate 44 and the assembly continued thereafter in the manner described above in connection with the lowermost plate subassembly 38.

In the embodiment of FIGS. 7 and 8, it is contemplated that the flow apertures 37 (not shown in FIG. 8) of the plates 34 be offset or staggered relative to the flow apertures of the plates 36 in order to prevent straight-line flows through two or more of the plates. Of course, any such straight-line flow seriously decreases the contact efficiency of the tower 30. Alternatively, every other plate, for example all of the plates 36, can be turned 90° relative to the plates 34 or vice versa, after the manner of the preceding figures. Such angular displacement of every other plate serves to stagger the arrays of flow apertures 37, without stamping out the aforementioned differing or offset arrays of low apertures on the plates 34, 36.

The larger spaces above the lower support grid 44 and on either side of the upper support grid provide access for assembly and maintenance purposes. Desirably, clean-out ports or the like (not shown) can be installed adjacent these locations in the shell 32.

To enhance the sealing capabilities of the sealing rings 82, the edges of the latter can be offset as required by plate thicknesses in the areas of the intermediate segments 34a, 36a. Thus, every other ring 82 can define the wider spacings between the intermediate segments and the remainder of the sealing rings 82 the narrower spacings. Alternatively, the sealing rings can be provided with uniform widths and each corner of the intermediate plate segments 34a, 36a can be notched (not shown) across the overlapping edge portions so that the weight of the sealing rings 82 and other components of the plate assembly or assemblies tend to mash the peripheral edges of the plate segments into the same plane, in the area of the sealing rings.

From the foregoing it will be seen that a novel and efficient gas-liquid contact apparatus has been described herein. The descriptive and illustrative materials employed herein are utilized for purposes of exemplifying the invention and not in limitation thereof. Accordingly, numerous modifications of the invention will occur to those skilled in the art without departing from the spirit and scope of the invention. Moreover, it is to be understood that certain features of the invention can be used to advantage without a corresponding use of other features thereof.

I claim:

1. A gas-liquid contact tower comprising an outer tower shell, a plurality of superimposed flat generally horizontal plates spaced vertically so that each carries a thin film of liquid discharged within said tower shell, said horizontal plates being provided with a plurality of flow apertures distributed substantially uniformly over the surface of said plates, said apertures permitting the thin liquid film on said plates to flow downwardly therethrough from plate to plate and permitting gas to flow upwardly therethrough from plate to plate, each of said plates comprising a plurality of segments stacked with their edge portions in overlapping relationship but without being welded together or otherwise directly and rigidly secured to one another, a plurality of tie rods extending vertically through registering apertures in said plates for clamping the plates together, at least one of said tie rods extending through registering apertures formed respectively in said overlapping segment edge portions, and at least those registering apertures for said one tie rod being larger respectively than the adjacent cross sections of said one tie rod and being shaped so that said plate segments can expand and contract in the planes thereof and in different directions transverse to one another.

2. A gas-liquid contact tower as recited in claim 1 wherein each of said segments has a portion slightly offset in a vertical direction about the thickness of a plate, whereby the various segments, when stacked in overlapping relationship, will be equidistant from each other.

3. The combination according to claim 1 wherein each of said tie rods is inserted through a plurality of spacers inserted respectively between said plates for maintaining the respective interplate spacings.

4. The combination according to claim 1 wherein said plates are arranged into alternating arrays of first and second plates respectively, each of said first plates having an intermediate one of said segments disposed with its edge portions respectively overlying the edge portions of adjacent first plate segments, and each of said second plates having a corresponding intermediate segment disposed with its edge portions respectively underlying the edge portions of adjacent second plate segments.

5. The combination according to claim 1 wherein said tie rods are threaded at at least their lower ends for threaded engagement with elongated anchor nuts secured to a foraminous support grid for said plates and said rods.

6. The combination according to claim 5 wherein each of said tie rods include a discrete threaded tie rod section joined to the associated tie rod by an elongated nut supporting a bottommost one of said plates, said tie rod sections in turn being threadingly engaged with said anchor nuts so that by manipulation of said elongated nuts and/or said tie rod sections the planarity and horizontality of said bottommost plate can be adjusted.

7. A gas-liquid contact tower comprising an outer tower shell, a plurality of superimposed flat generally horizontal plates spaced vertically so that each carries a thin film of liquid discharged within said tower shell, said horizontal plates being provided with a plurality of flow apertures distributed substantially uniformly over the surface of said plates, said apertures permitting the thin liquid film on said plates to flow downwardly therethrough from plate to plate and permitting gas to flow upwardly therethrough from plate to plate, each of said plates comprising a plurality of segments stacked with their edge portions in overlapping relationship but without being welded together or otherwise directly and rigidly secured to one another, a plurality of tie rods extending vertically through registering apertures in said plates for clamping the plates together, at least one of said tie rods extending through registering apertures formed respectively in said overlapping segment edge sections, and at least one edge of said segments having a vertically extending flange serving as a reinforcing rib as well as a handle to facilitate stacking of said segments in said overlapping relationship.

8. A gas-liquid contact tower as recited in claim 7 wherein said vertically extending flange is perforated so as to permit free flow of said thin film of liquid therethrough for uniform distribution thereof on the top surfaces of the segments.

9. A gas-liquid contact tower comprising an outer tower shell, a plurality of superimposed flat generally horizontal plates spaced vertically so that each carries a thin film of liquid discharged within said tower shell, said horizontal plates being provided with a plurality of flow apertures distributed substantially uniformly over the surface of said plates, said apertures permitting the thin liquid film on said plates to flow downwardly therethrough from plate to plate and permitting gas to flow upwardly therethrough from plate to plate, each of said plates comprising a plurality of segments stacked with their edge portions in overlapping relationship but without being welded together or otherwise directly and rigidly secured to one another, a plurality of tie rods extending vertically through registering apertures in said plates for clamping the plates together, at least one of said tie rods extending through registering apertures formed respectively in said overlapping segment edge portions, and the intermediate segments of said plates being provided with upstanding flanges at one edge and downwardly extending flanges at the other edge to provide reinforcement as well as to provide handles to facilitate stacking of said segments in said overlapping relationship.

10. A gas-liquid contact tower comprising an outer tower shell, a plurality of superimposed, flat, generally horizontal plates spaced vertically so that each carries a thin film of liquid discharged within said tower shell, said horizontal plates being provided with a plurality of flow apertures distributed substantially uniformly over the surface of said plates, said apertures permitting the thin liquid film on said plates to flow downwardly therethrough from plate to plate and permitting gas to flow upwardly therethrough from plate to plate, each of said plates comprising a plurality of segments stacked with their edge portions in overlapping relationship but without being welded together or otherwise directly and rigidly secured to one another, a plurality of tie rods extending vertically through registering holes in said plates for clamping the plates together, each of said tie rods being inserted through a plurality of spacers inserted respectively between said plates for maintaining the respective interplate spacings, and at least some of said spacers including at least one apertured portion having an edge closely and circumferentially fitting an adjacent surface of the associated one of said tie rods to prevent said liquid or gas from flowing along said tie rods.

11. A gas-liquid contact tower comprising an outer tower shell, a plurality of superimposed, flat, generally horizontal plates spaced vertically so that each carries a thin film of liquid discharged within said tower shell, said horizontal plates being provided with a plurality of flow apertures distributed substantially uniformly over the surface of said plates, said apertures permitting the thin liquid film on said plates to flow downwardly therethrough from plate to plate and permitting gas to flow upwardly therethrough from plate to plate, each of said plates comprising a plurality of segments stacked with their edge portions in overlapping relationship but without being welded together or otherwise directly and rigidly secured to one another, a plurality of tie rods extending vertically through registering holes in said plates for clamping the plates together, said tie rods being threaded at at least their lower ends for threaded engagement with elongated anchor nuts secured to a foraminous support for said plates and rods, said foraminous support grid including numbers of crossed bars, said anchor nuts being secured to said grid at the points of crossing of said bars.

12. A gas-liquid contact tower comprising an outer tower shell, a plurality of superimposed, flat, generally horizontal plates spaced vertically so that each carries a thin film of liquid discharged within said tower shell, said horizontal plates being provided with a plurality of flow apertures distributed substantially uniformly over the surface of said plates, said apertures permitting the thin liquid film on said plates to flow downwardly therethrough from plate to plate and permitting gas to flow upwardly therethrough from plate to plate, each of said plates comprising a plurality of segments stacked with their edge portions in overlapping relationship but without being welded together or otherwise directly and rigidly secured to one another, a plurality of tie rods extending vertically through registering holes in said plates for clamping the plates together, said plates are grouped into a plurality of plate subassemblies, each of said tie rods including rod sections of a length sufficient to pass through respective ones of said plate subassemblies, and means for joining said rod sections in end-to-end relation so that said tie rods including said joining means extend uninterruptedly through an assembly of said subassemblies.

13. The combination according to claim 12 wherein said tie rod section joining means are shaped in addition to space the segments of an uppermost plate of a lower adjacent subassembly from the corresponding segments of the lowermost plate of an adjacent upper subassembly.

14. The combination according to claim 12 wherein a number of guide rods are extended continuously through said subassemblies to aid in aligning the plate segments of each subassembly to facilitate insertion of said tie rod sections.

15. The combination according to claim 12 including a number of guide rods extending continuously through all of said plate subassemblies for aligning said subassemblies.

16. A gas-liquid contact tower comprising an outer tower shell, a plurality of superimposed, flat, generally horizontal plates spaced vertically so that each carries a thin film of liquid discharged within said tower shell, said horizontal plates being provided with a plurality of flow apertures distributed substantially uniformly over the surface of said plates, said apertures permitting the thin liquid film on said plates to flow downwardly therethrough from plate to plate and permitting gas to flow upwardly therethrough from plate to plate, each of said plates comprising a plurality of segments stacked with their edge portions in overlapping relationship but without being welded together or otherwise directly and rigidly secured to one another, a plurality of tie rods extending vertically through registering holes in said plates for clamping the plates together, said plates being grouped into a number of plate assemblies, a group of said tie rods being provided for each of said assemblies, said tie rods extending respectively through said assemblies and being secured respectively to foraminous supports spaced respectively below and between said assemblies, and a number of guide rods extending continuously through all of said assemblies and said supports for aligning said assemblies and said supports.

17. The combination according to claim 16 wherein each of said guide rods is inserted through a number of spacing members disposed to space each of said foraminous supports from adjacent ones of said plate assemblies.

18. A gas-liquid contact tower comprising an outer tower shell, a plurality of superimposed, flat, horizontal plates spaced vertically so that each carries a thin film of liquid discharged within said tower shell, said horizontal plates being provided with a plurality of flow apertures distributed substantially uniformly over the surface of said plates, said apertures permitting the thin liquid film of said plates to flow downwardly therethrough from plate to plate and permitting gas to flow upwardly therethrough from plate to plate, each of said plates comprising a plurality of segments stacked with their edge portions in overlapping relationship but without being welded together or otherwise directly and rigidly secured to one another, a plurality of tie rods extending vertically through registering holes in said plates for clamping the plates together, said plates being grouped into a number of plate assemblies, a group of said tie rods being provided for each of said assemblies, and a number of foraminous supports spaced respectively below and between said assemblies, said tie rods extending respectively through said plate assemblies and being secured to associated ones of said foraminous supports.

19. A gas-liquid contact tower comprising an outer tower shell, a plurality of superimposed, flat, generally horizontal plates spaced vertically so that each carries a thin film of liquid discharged within said tower shell, said horizontal plates being provided with a plurality of flow apertures distributed substantially uniformly over the surface of said plates, said apertures permitting the thin liquid film of said plates to flow downwardly therethrough from plate to plate and permitting gas to flow upwardly therethrough from plate to plate, a plurality of tie rods extending vertically through registering holes in said plates for clamping the plates together, each of said tie rods being inserted through a plurality of spacers inserted respectively between said plates for maintaining the respective interplate spacings, and at least some of said spacers including at least one apertured portion having an edge closely and circumferentially fitting an adjacent surface of the associated one of said tie rods to prevent said liquid or gas from flowing along said tie rods.

20. A gas-liquid contact tower comprising an outer tower shell, a plurality of superimposed, flat, generally horizontal plates spaced vertically so that each carries a thin film of liquid discharged within said tower shell, said horizontal plates being provided with a plurality of flow apertures distributed substantially uniformly over the surface of said plates, said apertures permitting the thin liquid film on said plates to flow downwardly therethrough from plate to plate and permitting gas to flow upwardly therethrough from plate to plate, a plurality of tie rods extending vertically through registering holes in said plates for clamping the plates together, said plates are grouped into a plurality of plate subassemblies, each of said tie rods including rod sections of a length sufficient to pass through respective ones of said plate subassemblies, and means for joining said rod sections in end-to-end relation so that said tie rods including said joining means extend uninterruptedly through an assembly of said subassemblies.

21. A gas-liquid contact tower comprising an outer tower shell, a plurality of superimposed, flat, generally horizontal plates spaced vertically so that each carries a thin film of liquid discharged within said tower shell, said horizontal plates being provided with a plurality of flow apertures distributed substantially uniformly over the surface of said plates, said apertures permitting the thin liquid film on said plates to flow downwardly therethrough from plate to plate and permitting gas to flow upwardly therethrough from plate to plate, a plurality of tie rods extending vertically through registering holes in said plates for clamping the plates together, said plates being grouped into a number of plate assemblies, a group of said tie rods being provided for each of said assemblies, said tie rods extending respectively through said assemblies and being secured respectively to foraminous supports spaced respectively below and between said assemblies, and a number of guide rods extending continuously through all of said assemblies and said supports for aligning said assemblies and said supports.

* * * * *